(12) United States Patent
Shigenobu

(10) Patent No.: US 8,015,498 B2
(45) Date of Patent: Sep. 6, 2011

(54) INFORMATION DISPLAY DEVICE AND IMAGE FORMING APPARATUS

(75) Inventor: Dai Shigenobu, Chuo-ku (JP)

(73) Assignee: Kyocera Mita Corporation, Osaka (JP)

( * ) Notice: Subject to any disclaimer, the term of this patent is extended or adjusted under 35 U.S.C. 154(b) by 369 days.

(21) Appl. No.: 12/315,016

(22) Filed: Nov. 26, 2008

(65) Prior Publication Data

US 2009/0144663 A1    Jun. 4, 2009

(30) Foreign Application Priority Data

Nov. 29, 2007 (JP) .................................. 2007-309470
Nov. 29, 2007 (JP) .................................. 2007-309471

(51) Int. Cl.
*G06F 3/048* (2006.01)

(52) U.S. Cl. ......... 715/765; 715/810; 715/846; 715/835

(58) Field of Classification Search .................. 715/810, 715/817, 818, 819, 830, 833, 835, 841, 846, 715/764, 765; 707/1, 705, 805
See application file for complete search history.

(56) References Cited

U.S. PATENT DOCUMENTS

| | | | | |
|---|---|---|---|---|
| 6,484,189 | B1 * | 11/2002 | Gerlach et al. | 715/201 |
| 2002/0123368 | A1 * | 9/2002 | Yamadera et al. | 455/556 |
| 2005/0122343 | A1 * | 6/2005 | Bailey et al. | 345/619 |
| 2007/0085840 | A1 * | 4/2007 | Asaka et al. | 345/173 |
| 2009/0066650 | A1 * | 3/2009 | Bells et al. | 345/167 |
| 2009/0172587 | A1 * | 7/2009 | Carlisle et al. | 715/781 |

FOREIGN PATENT DOCUMENTS

JP      2007-179332      7/2007

* cited by examiner

*Primary Examiner* — Xiomar L Bautista
(74) *Attorney, Agent, or Firm* — Jordan and Hamburg LLP

(57) ABSTRACT

A display control section 77 causes meta-information (attribute information 73 and function information 75) related to an icon 79 read out at step S14 to be dynamically switching-displayed in a space 81 equivalent to two icons, i.e., a display area of unselected icons, said display area not being required to display thereof any longer, as a result of selecting an icon that fits the intent of a user. Thereby, it becomes possible to display with good visibility the meta-information related to the icon selected by the user, out of a plurality of icons list-displayed on the display screen, while effectively utilizing resources related to the display screen.

7 Claims, 8 Drawing Sheets

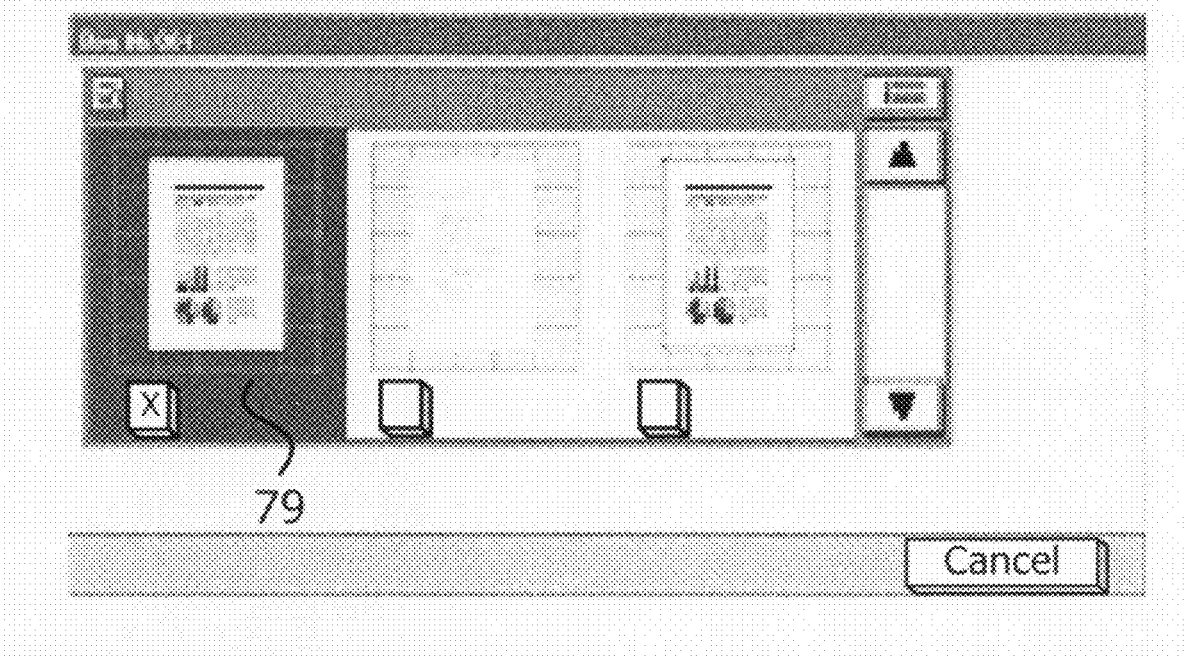

INFORMATION DISPLAY DEVICE AND IMAGE FORMING APPARATUS

BACKGROUND OF THE INVENTION

1. Field of the Invention

The present invention relates to an information display device capable of displaying with good visibility meta-information (metadata) related to icons selected by a user out of a plurality of icons list-displayed on a display screen while effectively utilizing resources related to the display screen. The present invention relates also to an image forming apparatus mounted thereon with the information display device.

2. Description of the Related Art

Conventionally, in information terminals, for example, there is adopted an information display technology for improving the visibility of information of icons, etc., displayed on a standby screen.

Of these technologies, for example, Japanese Published Unexamined Patent Application No. 2007-179332 discloses an information display technology in which when any one of a plurality of icons list-displayed on an icon display area on the standby screen is selected, icon information corresponding to the selected icon is obtained, and an icon based on the icon information is displayed in an image display area instead of an image that is being displayed.

However, in the aforementioned prior art, the display screen is previously segmented into each information attribute different from each other, such as an icon display area, an image display area, a reproduced-music information display area, etc., and in each of the display areas fixedly set in this manner, each of the corresponding attribute information is displayed. Thus, in a display area in which no corresponding attribute information is present, resources related to the display screen are inevitably wasted. Further, when there is a large number of attribute information targeted for display, the area for displaying each attribute information needs to be narrow, which often impairs the visibility related to the attribute information display.

SUMMARY OF THE INVENTION

An object of the present invention is to display with good visibility meta-information (metadata) related to icons selected by a user out of a plurality of icons list-displayed on a display screen while effectively utilizing resources related to the display screen.

In order to achieve the aforementioned object, it is the most primary characteristic to be constructed so that an information display device according to the present invention includes: a display section configured to list-display on a display screen images of at least a plurality of icons related to a data file targeted for information processing; a meta-information storing section storing each meta-information related to each icon, said each meta-information being associated with each of the plurality of icons; a selected-information obtaining section obtaining selected information when out of the plurality of icons list-displayed on the display screen, an icon that fits an intent of a user is selected; and a display control section reading out the meta-information related to the selected icon based on the selected information obtained in the selected-information obtaining section and a stored content of the meta-information storing section, and also controlling to display, instead of unselected icons other than the selected icon, the meta-information related to the read-out icon in an area on the display screen on which the unselected icons have been displayed.

In the information display device according to the present invention, the display control section reads out the meta-information related to the selected icon based on the selected information obtained in the selected-information obtaining section and a stored content of the function information storing section, and also controls to display, instead of unselected icons other than the selected icon, the meta-information related to the read-out icon in an area on the display screen on which the unselected icons have been displayed. Thereby, as a result of selecting an icon that fits the intent of a user, in a space which has been the display area of the unselected icons, said display area not being required to display thereof any longer, the meta-information related to the read-out icon is dynamically switching-displayed. Therefore, according to the information display device of the present invention, it becomes possible to display with good visibility the meta-information related to the icon selected by the user, out of a plurality of icons list-displayed on the display screen, while effectively utilizing resources related to the display screen.

BRIEF DESCRIPTION OF THE DRAWINGS

FIGS. 4a, 4b, and 4c are diagrams each showing an example of transition of a display screen when an icon selecting operation is performed in the image forming apparatus;

DETAILED DESCRIPTION OF THE PREFERRED EMBODIMENTS

Figure 1:
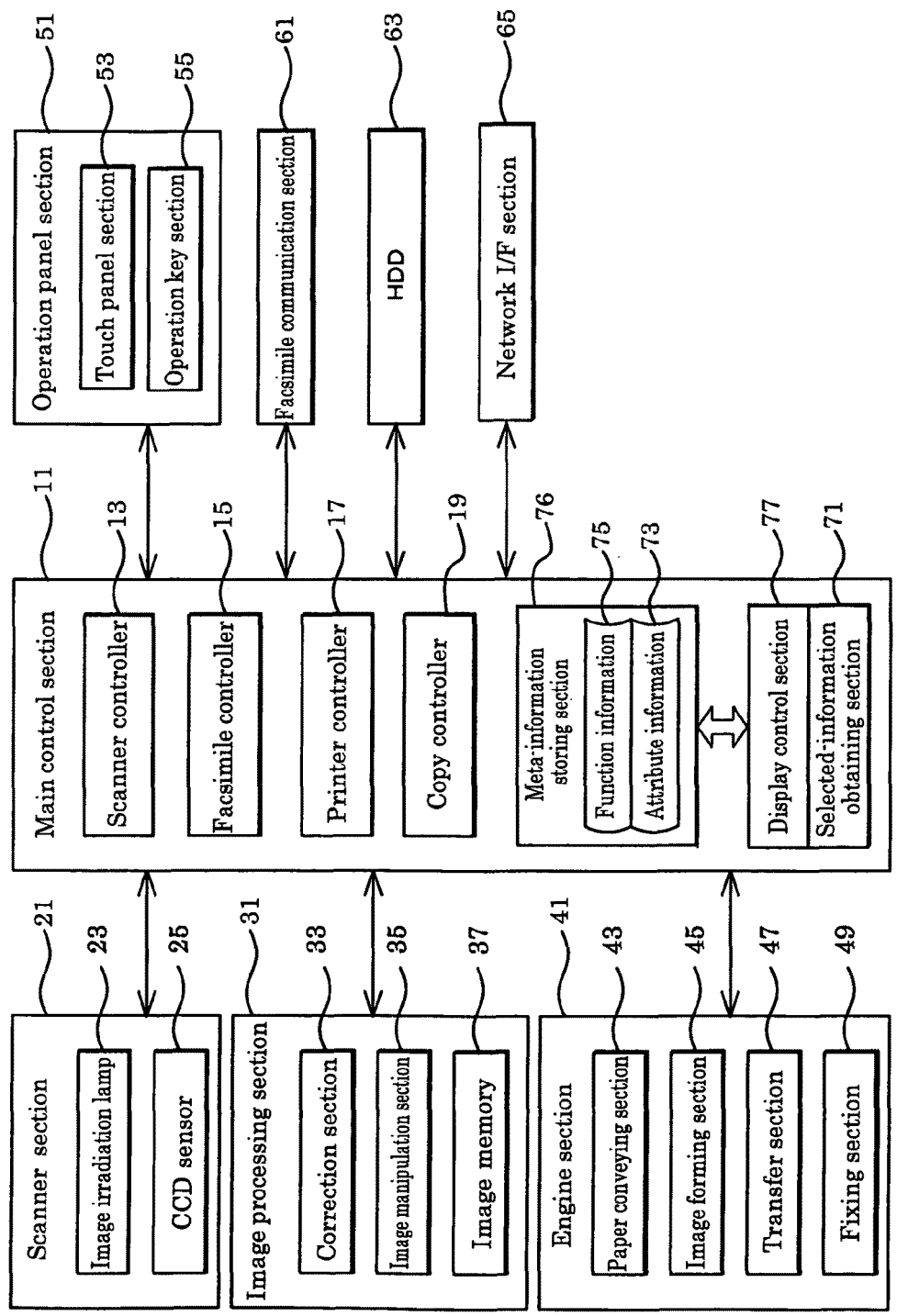
FIG. 1 is a functional block diagram showing a schematic configuration of an image forming apparatus mounted thereon with an information display device according to an embodiment of the present invention.

Hereinafter, an information display device according to an embodiment of the present invention is described in detail with reference to the drawings by illustrating an image forming apparatus mounted thereon with the information display device.

In an image forming apparatus mounted thereon with an information display device according to an embodiment of the present invention, various functions including a copy job, a facsimile transmission job, a print job, or a network transmission (mail transmission or data transmission) job, for example, are available, which is controlled by a main control section 11 composed of a microcomputer and dedicated hardware circuitry, etc. As input/output devices connected to the main control section 11 and taking charge of various functions, the image forming apparatus includes a scanner section 21, an image processing section 31, an engine section 41, an operation panel section 51, a facsimile communication section 61, a hard disk drive (HDD) 63, and a network interface (I/F) section 65.

The main control section 11 houses a scanner controller 13 controlling an operation for realizing a scanner function, a facsimile controller 15 controlling an operation for realizing a facsimile function, a printer controller 17 controlling an operation for realizing a printer function, and a copy controller 19 controlling an operation for realizing a copy function. The main control section 11 has overall control for an operation of the entire apparatus.

The scanner section 21 includes an image irradiation lamp 23 and a charge coupled device (CCD) sensor 25 constituting a scanner (not shown). The image irradiation lamp 23 irradiates a document with light and the CCD sensor 25 receives its reflected light, whereby the scanner section 21 reads out an image from the document and outputs image data corresponding to the read-out image to the image processing section 31.

The image processing section 31 includes a correction section 33, an image manipulation section 35 and an image memory 37. The image processing section 31 processes the image data having been read by the scanner section 21, with the use of the correction section 33 and the image manipulation section 35, as necessary, and stores the processed image data on the image memory 37 or outputs the processed image data to the engine section 41, the facsimile communication section 61, etc. The correction section 33 applies a predetermined correction processing such as a level correction, a gamma correction, and the like, to the image data which has been read by the scanner section 21. The image manipulation section 35 performs a variety of manipulating processings such as compression or decompression and expansion or contraction of the image data.

The engine section 41 includes a paper conveying section 43 composed of a paper feeding cassette, a paper feeding roller, etc., which are not shown, an image forming section 45 composed of a photosensitive drum, an exposure system, a development system, etc., which are not shown, a transfer section 47 composed of a transfer roller, etc., (not shown), and a fixing section 49 composed of a fixing roller, etc., (not shown). The engine section 41 prints out an image on a sheet of paper by means of; image data which has been read by the scanner section 21; image data which has been transmitted from a client personal computer (PC), etc., by a local area network (LAN) via the network I/F section 65; and image data of facsimile data, etc., which have been received from an external facsimile machine, etc., by using the facsimile communication section 61. More specifically, the paper conveying section 43 conveys a sheet of paper to the image forming section 45. The image forming section 45 forms a toner image corresponding to the foregoing image data. The transfer section 47 transfers the toner image to the sheet of paper. The fixing section 49 fixes the toner image on the sheet of paper to form an image.

Figure 2:
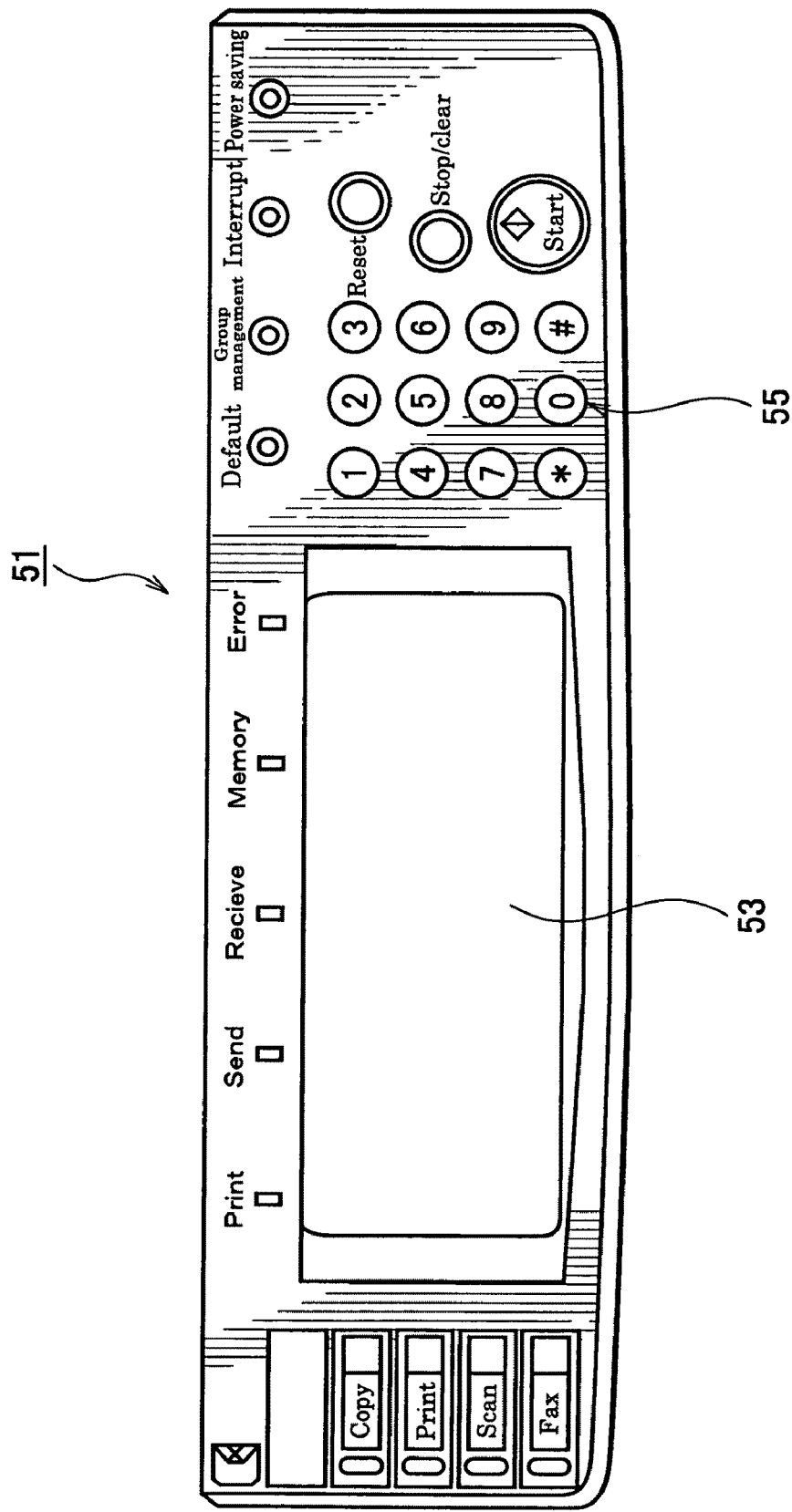
FIG. 2 is an external view of an operation panel section in the image forming apparatus.

The operation panel section 51 includes a touch panel section 53 and a function key section 55, as shown in FIG. 1 and FIG. 2. The operation panel section 51 is used in order that a user may conduct an operation related to a scanner function, a facsimile function, a printer function, a copy function, etc. The operation panel section 51 applies an operation command, etc., by the user to the main control section 11.

The touch panel section 53, which functions as one portion of a display section and a selected-information obtaining section of the present invention, is composed of a touch panel unit, etc., combined with a touch panel and a color liquid crystal display (LCD). The touch panel section 53 displays various setting screens, i.e., displays information to set a document size, a copy size, and the number of copies, for example, in executing the copy function, and also displays an operation button and the like in order that the user may input various operation commands by touching a relevant place. The touch panel section 53 is used when displaying an operation setting screen related to a document box function or also when list-displaying an image of a plurality of icons related to a data file targeted for information processing on the display screen by using the function. When an icon that fits an intent of a user, out of a plurality of icons list-displayed on the display screen, is selected, the touch panel section 53 is also used at the time of obtaining the selection information.

The function key section 55 includes a plurality of function keys and short-cut keys operated by the user at the time of selecting various functions related to an image forming process. The function key section 55 is used, for example, when the user selectively executes a key input operation for a necessary function from among various functions such as the copy function, the printer function, the scanner function, and the facsimile function or when the user inputs operations such as the number of copies, and a copy execution command.

The facsimile communication section 61 includes an encoding/decoding section (not shown), a modulation and demodulation section (not shown), and a network control unit (NCU) (not shown). The facsimile communication section 61 transmits image data of a document which has been read by the scanner section 21, to a facsimile machine, etc., via a telephone line, and receives image data which has been transmitted by a facsimile machine, etc.

The hard disk drive (HDD) 63 stores the image data which has been read by the scanner section 21 and various data such as an output format set in the image data. The image data stored in the HDD 63 is not only used inside an image forming apparatus, a program, and a recording medium but also checked from a client PC, etc., via the network I/F section 65 or transferred to a predetermined folder on a client PC, a file transfer protocol (FTP) server, etc., as necessary.

The network I/F section 65 controls transmission and reception of various data relative to a user terminal 67 such as a client PC connected via the LAN, with use of a network interface (10/100 Base-TX), etc.

In order to display, with good visibility, meta-information related to an icon selected by the user, out of a plurality of icons list-displayed on the display screen while effectively utilizing resources related to the display screen, the main control section 11 is constructed so as to include: a selected-information obtaining section 71 obtaining selected information when an icon that fits an intent of a user, out of a plurality of icons list-displayed on the display screen, is selected; a meta-information storing section 76 storing each meta-information related to each icon, said meta-information being associated with each of a plurality of icons; and a display control section 77 reading out the meta-information related to the selected icon based on the selected information obtained in the selected-information obtaining section 71 and a stored content of the meta-information storing section 76, and also controlling to display, instead of unselected icons other than the selected icon, the meta-information related to the read-out icon in an area on the display screen on which the unselected icons have been displayed. The meta-information related to the icon is a concept that encompasses attribute information 73 and function information 75 related to the icon. Of the two, the attribute information 73 related to the icon is bibliographic information of a data file corresponding to the icon, for example, and in the embodiment of the present invention, examples thereof may include a title name of the relevant data file, a creator name thereof, an administrator name thereof, a company (department) name of a user thereof, and other comments thereof (for example, meta-information whether this information is classified information, and if so, what level of confidentiality?, etc.). On the other hand, the function information 75 related to the icon is operation or setting information for utilizing a function of a data file corresponding to the icon, for example, and in the embodiment of the present invention, examples thereof may include items related to print, transmit, copy, move, or delete, etc.

Figure 3:
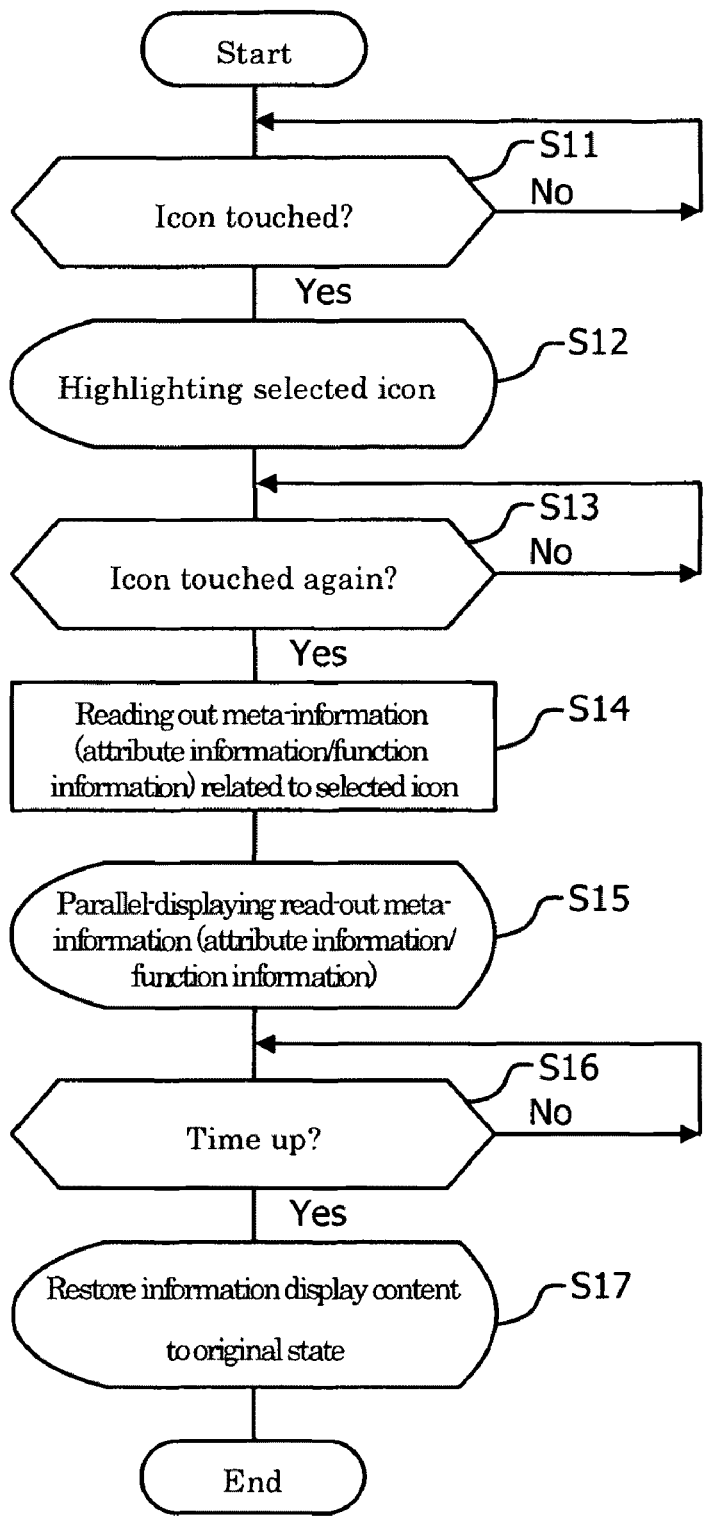
FIG. 3 is an operational flow chart at the time of selecting an icon according to the image forming apparatus.
Figure 4B:
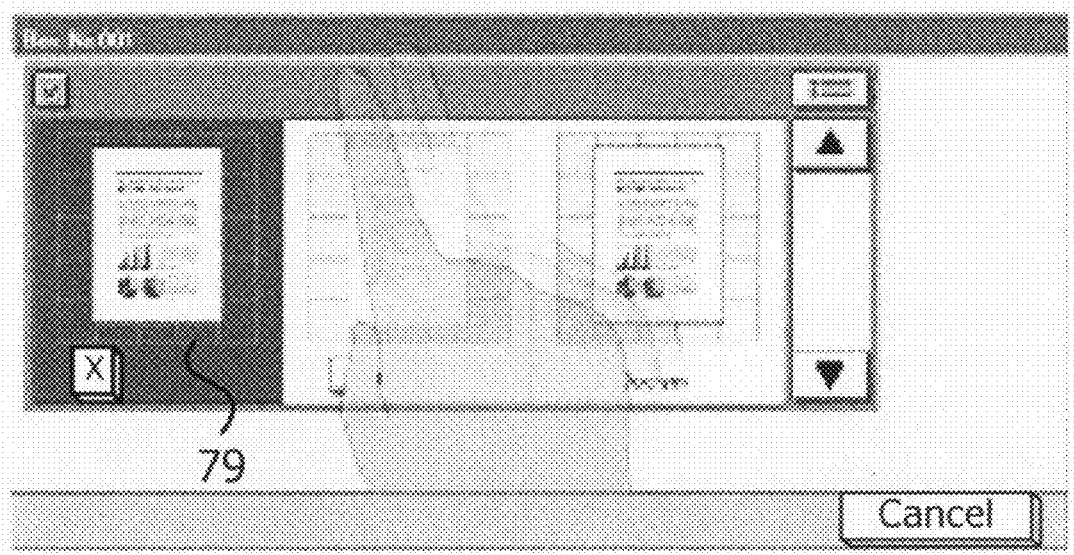
Figure 4C:
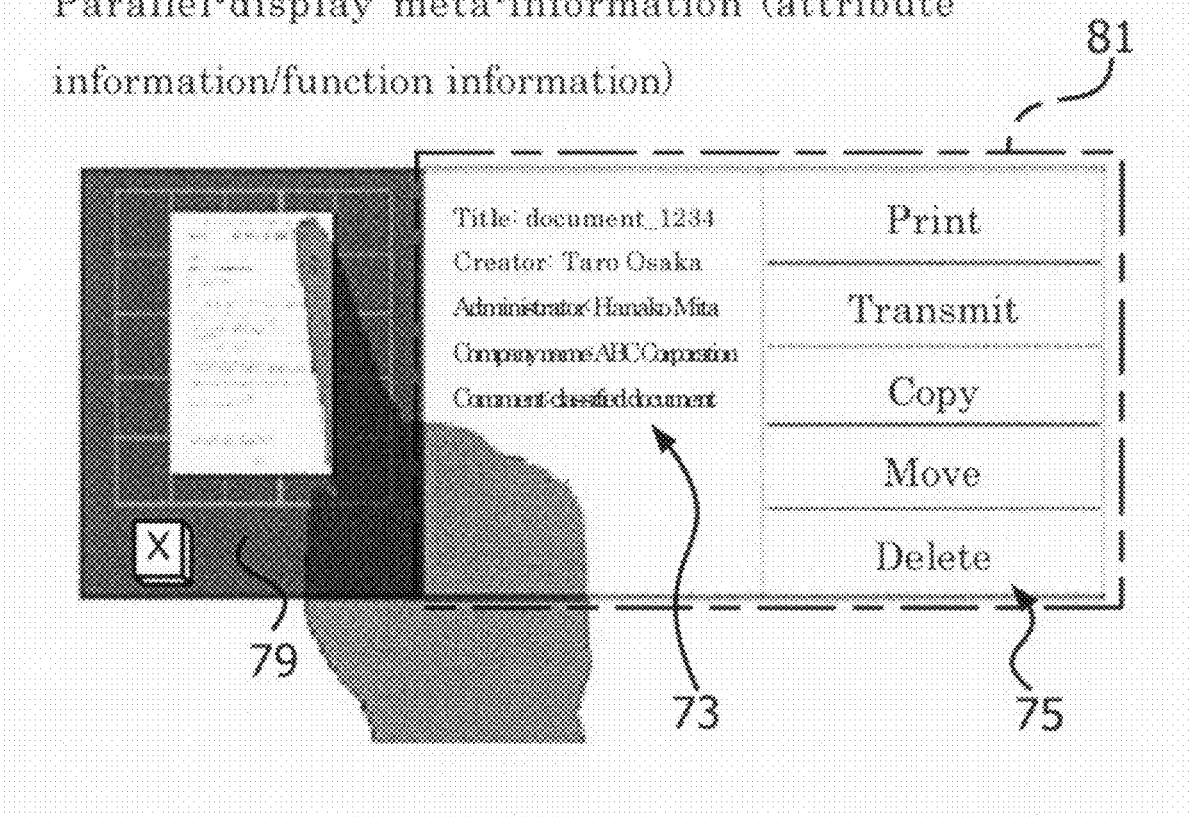

Subsequently, an operation of the image forming apparatus mounted thereon with the information display device according to the embodiment of the present invention is described with reference to FIG. 3 and FIG. 4.

As an assumption, it should be noted that the image forming apparatus is placed in a state that a certain user uses a document box function to list-display images of a plurality of icons on the display screen.

At this time, when the icon that fits the intent of a user, out of a plurality of icons list-displayed on the display screen, is touched by a user's finger, the selected information is directed at the selected-information obtaining section 71 via the touch panel section 53 (step S11).

In response thereto, the display control section 77 highlights an icon 79 selected at step S11 (see FIG. 4a) in a color different from those of the other icons, for example, so that the icon can be distinguished from the other icons (step S12). Along with this highlight or instead of this highlight, the display control section 77 may adopt a configuration to impart a checkbox corresponding to the selected icon with a checkmark (see FIG. 4a).

Subsequently, when the icon 79 selected at step S11 is touched again by the user's finger, the selected information is directed at the selected-information obtaining section 71 via the touch panel section 53 (step S13).

In response thereto, based on the selected information related to the icon 79 touched again at step S13 (see FIG. 4b) and the stored content of the meta-information storing section 76, the display control section 77 reads out each of the meta-information (the attribute information 73 and the function information 75) related to the selected icon (step S14), and also controls to display, instead of the unselected icons other than the selected icon 79, the attribute information 73 and the function information 75 (see FIG. 4c) related to the icons read out at step S14 in a space 81 (see FIG. 4c) equivalent to two icons which have been a display area on the display screen and in which the unselected icons have been displayed until immediately therebefore (see FIG. 4c) (step S15).

Subsequently, the display control section 77 sets a predetermined time period (a time period that can be appropriately set and changed by the user, such as for three seconds, for example) as a set value for a count down timer (not shown) housed in the main control section 11, and also monitors whether the timer is timed up (step S16). When it is determined that the count down timer is timed up during this monitoring (see "YES" at step S16), the display control section 77 restores an information display content on the display screen to the original state (step S17). More specifically, the display control section 77 list-displays the unselected icons that have been displayed until immediately before the meta-information has been displayed, instead of a parallel display of the meta-information related to step S15 (see FIG. 4a), and thereafter, ends a series of processes.

As described above, along with selecting the icon that fits the intent of a user, in the space 81 equivalent to two icons, i.e., the display area of the unselected icons, said display area not being required to display thereof any longer, the meta-information (the attribute information 73 and the function information 75) related to the icon 79 read out at step S14 is dynamically switching-displayed. Therefore, according to the information display device according to the embodiment of the present invention, out of a plurality of icons list-displayed on the display screen, the meta-information (attribute information 73 and the function information 75) related to the icon 79 selected by the user can be displayed with good visibility while utilizing effectively the resources related to the display screen.

The user who visually recognizes the attribute information 73 out of the meta-information related to the icon 79 becomes able to grasp the overview of the data file related to the icon 79 through, as bibliographical information of the data file corresponding to the icon 79, for example, a title name (in the embodiment, "document_1234"), a creator name (in the embodiment, "Taro Osaka"), an administer name (in the embodiment, "Hanako Mita"), a company (department) name of a user (in the embodiment, "ABC Corporation"), and other comments (for example, attribute information whether this information is classified information, and if so, what level of confidentiality?, etc). As a result, upon searching a document that fits the intent of a user out of the document box, the user can significantly improve the workability.

Further, the user who visually recognizes the function information 75 out of the meta-information related to the icon 79 becomes able to improve an information processing efficiency of the data file related to the icon 79 through selective utilization of the function items related to print, transmit, copy, move, or delete, and so on, for example, as the operation or setting information for utilizing a function of the data file corresponding to the icon 79. As a result, upon searching a document that fits the intent of a user out of the document box so as to apply a required information process to the searched document, the user can significantly improve the workability.

Moreover, according to the information display device according to the embodiment of the present invention, it is possible to expect chained synergy resulting from an effective utilization such as a display screen space generated as a result of implementing the effective utilization of resources related to the display screen being assigned to an extension function, used to increase the number of icons that can be list-displayed, and so on.

According to the information display device according to the embodiment of the present invention, as an operation for dynamically switching-displaying the attribute information 73 and the function information 75 related to the icon 79, a very simple operation that is to select the icon is adopted. Thereby, any person can operate intuitively and an excellent information display function can be immediately enjoyed.

According to the image forming apparatus mounted thereon with the information display device according to the present invention, at the user's operation instruction applied via the information display device, the information processing operation according to the operation instruction is executed. Thus, the user can apply the operation instruction while enjoying an excellent information display function with intuitiveness and high operability.

Figure 5:
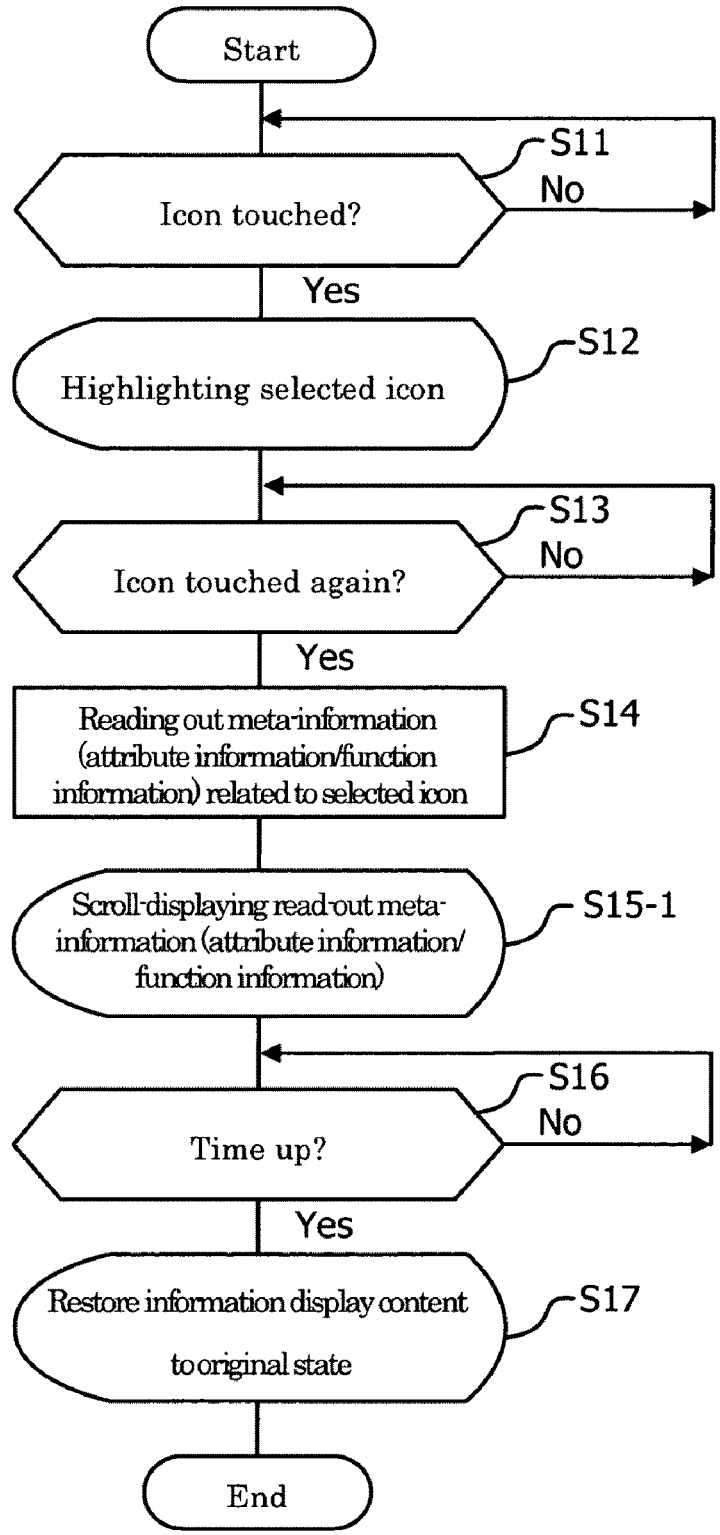
FIG. 5 is an operational flow chart at the time of selecting an icon according to a modified example of the image forming apparatus.
Figure 6:
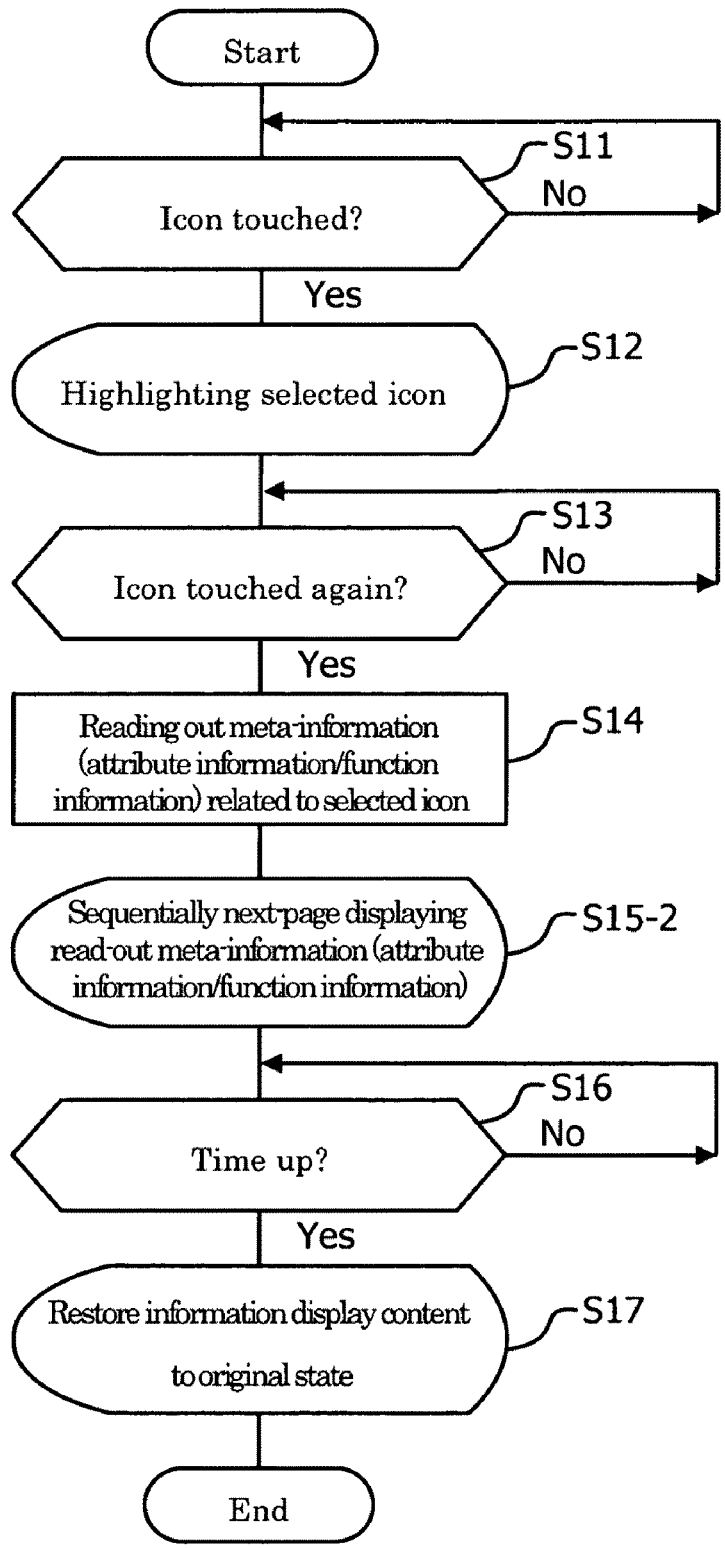
FIG. 6 is an operational flow chart at the time of selecting the icon according to a modified example of the image forming apparatus.

The present invention may adopt a configuration to impart the display control section with a function of scroll-displaying (see step S15-1 in FIG. 5), according to the intent of a user, the meta-information (the attribute information or the function information) related to the read-out icon, instead of the unselected icons other than the selected icon, in the area on the display screen on which the unselected icons have been displayed.

The present invention may also adopt a configuration to impart the display control section with a function of sequentially next-page displaying (see step S15-2 in FIG. 5), according to the intent of a user, the meta-information (the attribute information or the function information) related to the read-out icon, instead of the unselected icons other than the selected icon, in the area on the display screen on which the unselected icons have been displayed.

Further, along with the touching again of the icon at step S13, the display control section 77 may adopt a configuration in which a display manner of the attribute information 73 or the function information 75 related to the icon read out at step S14 is changed step by step and displayed. In this case, it may be possible to configure to change the displayed content step by step such that at the time of touching again the icon at step S13, the attribute information 73 related to the icon is displayed, and further, at the time of touching once again the icon, the function information 75 is displayed instead of the attribute information 73 related to the icon or along with the attribute information 73 related to the icon, for example.

The present invention should not be restricted to the aforementioned embodiment and can be modified appropriately without departing from the gist or technical idea of the present invention understood entirely from the claims and the specification. Information display devices or image forming apparatuses with such modifications are also to fall within the technical scope of the present invention.

That is, for example, an example in which the attribute information 73 and the function information 75 related to the icon 79 read out at step S14 are dynamically switching-displayed in the space 81 equivalent to the two icons, i.e., the display area of the unselected icons, said display area not being required to display thereof, along with the touching of the icon that fits the intent of a user is described in the embodiment of the present invention. However, the present invention is not restricted to the embodiment. That is, the "selection of the icon" for use in the present invention is a concept that encompasses not only touching the icon that fits the intent of a user but also an operation for placing a cursor over an area corresponding to the icon that fits the intent of a user via an appropriate operation section such as a mouse, a slide pad, and a track ball, for example. Therefore, an implementation in which along with the operation for placing a cursor over an area corresponding to the icon that fits the intent of a user, the information display manner is dynamically switching-displayed is also included in the technological range of the present invention.

Finally, as a matter of course, the information display device according to the present invention is not restricted to the application to the image forming apparatus, and can be applied to and incorporated in any information apparatus having a user interface of a mode in which a required icon, out of a plurality of icons list-displayed on the display screen, is selected by the user.

What is claimed is:

1. An information display device, comprising:
   a display section configured to list-display on a display screen images of at least a plurality of icons together related to a data file targeted for information processing, each one icon of the plurality of icons having meta-information associated therewith;
   a meta-information storing section storing respective meta-information associated with the plurality of icons; and
   a selected-information obtaining section obtaining selected information when out of the plurality of icons list-displayed on the display screen, an icon that fits an intent of a user is selected; and
   a display control section reading out the meta-information related to the selected icon based on the selected information obtained in the selected-information obtaining section and a stored content of the meta-information storing section, and in response to said selection of the icon the display control section automatically altering display content to continue to list-display the selected icon in place without list-display of the unselected icons and to display in place of said unselected icons the meta-information related to the read-out selected icon in an area on the display screen where the unselected icons were previously list-displayed.

2. The information display device according to claim 1, wherein said altering by the display control section is for a predetermined time period, then the display control section returns list-display content to include the selected icon and the unselected icons without the meta-information of the selected icon.

3. The information display device according to claim 1, wherein said altering by the display control section comprises scroll-displaying according to an intent of a user, the meta-information related to the read-out icon in the area on the display screen on which the unselected icons were previously list-displayed.

4. The information display device according to claim 1, wherein said altering by the display control section comprises sequentially next-page displays displaying according to an intent of a user, the meta-information related to the read-out icon in the area on the display screen on which the unselected icons were previously list-displayed.

5. The information display device according to claim 1, wherein the meta-information associated with said one icon comprises attribute information.

6. The information display device according to claim 1, wherein the meta-information associated with said one icon comprises function information, and
   wherein the function information related to said each one icon is information related to operation or setting for utilizing a function corresponding to said one icon.

7. The information display device according to claim 1, in combination with an image forming apparatus to respond to a user's operation instruction applied via the information display device to execute an information processing operation comprising the forming of an image by the image forming apparatus.

* * * * *